United States Patent
Ledet (10) Patent No.: US 11,658,816 B2
(45) Date of Patent: May 23, 2023

(54) DOCUMENT CONTROL SYSTEM FOR BLOCKCHAIN

(71) Applicant: PHILIPS NORTH AMERICA LLC, Cambridge, MA (US)

(72) Inventor: David Gerard Ledet, Allen, TX (US)

(73) Assignee: Philips North America LLC, Cambridge, MA (US)

(*) Notice: Subject to any disclaimer, the term of this patent is extended or adjusted under 35 U.S.C. 154(b) by 152 days.

(21) Appl. No.: 17/230,986

(22) Filed: Apr. 14, 2021

(65) Prior Publication Data

US 2021/0328785 A1 Oct. 21, 2021

Related U.S. Application Data

(60) Provisional application No. 63/010,651, filed on Apr. 15, 2020.

(51) Int. Cl.
*H04L 9/08* (2006.01)
*G06F 7/58* (2006.01)

(52) U.S. Cl.
CPC ............ *H04L 9/0861* (2013.01); *G06F 7/588* (2013.01)

(58) Field of Classification Search
CPC .............................. H04L 9/0861; G06F 7/588
See application file for complete search history.

(56) References Cited

U.S. PATENT DOCUMENTS

| | | | | |
|---|---|---|---|---|
| 10,296,764 | B1* | 5/2019 | Batishchev | G06F 21/602 |
| 10,535,062 | B1* | 1/2020 | Rule | G06Q 20/389 |
| 10,938,791 | B1* | 3/2021 | Munson | H04L 49/25 |
| 11,146,396 | B1* | 10/2021 | Bernat | G06F 3/0689 |
| 11,212,264 | B1* | 12/2021 | Griffin | H04L 9/14 |
| 2005/0257045 | A1* | 11/2005 | Bushman | H04L 63/12 713/156 |
| 2016/0283941 | A1* | 9/2016 | Andrade | G06Q 20/3829 |
| 2016/0321654 | A1* | 11/2016 | Lesavich | H04L 67/104 |
| 2017/0193619 | A1* | 7/2017 | Rollins | G06Q 50/184 |
| 2019/0267119 | A1* | 8/2019 | Witchey | G06Q 10/10 |
| 2019/0280856 | A1* | 9/2019 | Yeap et al. | G06Q 50/184 |
| 2020/0074463 | A1* | 3/2020 | Noble | G06Q 20/065 |
| 2020/0084037 | A1* | 3/2020 | Zhang | H04L 9/085 |
| 2020/0153606 | A1* | 5/2020 | Li | H04L 9/30 |
| 2020/0177373 | A1* | 6/2020 | Komandur | H04L 9/3247 |
| 2020/0204557 | A1* | 6/2020 | Singh | H04L 9/3239 |
| 2020/0252202 | A1* | 8/2020 | Madl | G06F 21/6218 |
| 2020/0280444 | A1* | 9/2020 | Tang | H04L 9/3247 |
| 2020/0328886 | A1* | 10/2020 | Newton | H04L 9/0858 |

(Continued)

FOREIGN PATENT DOCUMENTS

| | | | | | |
|---|---|---|---|---|---|
| WO | WO-2019179277 | A1 * | 9/2019 | | G06F 21/6218 |
| WO | WO-2019186282 | A1 * | 10/2019 | | G06F 16/219 |

*Primary Examiner* — Darshan I Dhruv (57) ABSTRACT

An example operation includes one or more of initiating a transaction of a blockchain by a contributing member of a group to assign a digital data based document to itself or to at least one other member of the group, validating a block of the blockchain associated with the transaction by the contributing member or the at least one other member that are verified, sending an ephemeral location of the document to the contributing member or the at least one other member that are verified, and modifying the document in the ephemeral location by the contributing member or the at least one other member that is verified.

20 Claims, 6 Drawing Sheets

(56) References Cited

U.S. PATENT DOCUMENTS

| | | |
|---|---|---|
| 2020/0380154 A1* | 12/2020 | Jayachandran ..... G06F 21/6227 |
| 2021/0117385 A1* | 4/2021 | Haldar ................ G06F 11/1448 |
| 2021/0119886 A1* | 4/2021 | Singla .................... H04L 63/20 |
| 2021/0152365 A1* | 5/2021 | Nosseir ................ H04L 9/3239 |
| 2021/0281395 A1* | 9/2021 | Narayanaswami ... H04L 9/3297 |

* cited by examiner

DOCUMENT CONTROL SYSTEM FOR BLOCKCHAIN

FIELD OF THE INVENTION

The current application is generally related to blockchain and more specifically related to the storing of documents in a blockchain.

BACKGROUND

Blockchain technology may be best utilized to share information amongst a group of individuals who have a mutual agreed upon advantage to sharing data that is dynamic in nature.

SUMMARY

One example embodiment provides a method that includes one or more of initiating a transaction of a blockchain by a contributing member of a group to assign a digital data based document to itself or to at least one other member of the group, validating a block of the blockchain associated with the transaction by the contributing member or the at least one other member that are verified, sending an ephemeral location of the document to the contributing member or the at least one other member that are verified, and modifying the document in the ephemeral location by the contributing member or the at least one other member that is verified.

Another example embodiment provides a system that includes a memory communicably coupled to a process, wherein the processor is configured to perform one or more of initiate a transaction of a blockchain by a contributing member of a group to assign a digital data based document to itself or to at least one other member of the group, validate a block of the blockchain associated with the transaction by the contributing member or the at least one other member that are verified, send an ephemeral location of the document to the contributing member or the at least one other member that are verified, and modify the document in the ephemeral location by the contributing member or the at least one other member that is verified.

A further example embodiment provides a non-transitory computer readable medium comprising instructions, that when read by a processor, cause the processor to perform one or more of initiating a transaction of a blockchain by a contributing member of a group to assign a digital data based document to itself or to at least one other member of the group, validating a block of the blockchain associated with the transaction by the contributing member or the at least one other member that are verified, sending an ephemeral location of the document to the contributing member or the at least one other member that are verified, and modifying the document in the ephemeral location by the contributing member or the at least one other member that is verified.

DETAILED DESCRIPTION

The present application provides a system, method and non-transitory computer readable medium to pass a document from one party or group member to another while not allowing more than one party at a time to view or modify the document. The instant application utilizes a blockchain to share information such as transactions for mutual agreement of which party can hold, modify, and subsequently relinquish a document in the form of digital data. The present application provides for the control of a given document in the form of digital data. The data may not be viewed or modified by more than one party or group member at a time. This is an advantage where the data may be sensitive because of its content or the timing of additions or modifications to the document.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first", "second", and "third" may be used to differentiate elements, but the modifiers do not necessarily indicate any particular order. For example, a first party may be so named although, in reality, it may be a second, third, and/or fourth party.

The present application provides the monitoring, updating, and maintenance of a proposal management system based on a blockchain system that will provide the ability to pass digital data from one blockchain group member to the next by way of an abstracted cryptographic key, coupled with a location link. A blockchain will serve as the mechanism to assign the digital data document to a given group member, as well as facilitate the transfer of the digital data document if the majority of group members agree.

The following key concepts will be helpful for the proposed solution:

Blockchain: A blockchain, originally block chain, is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and exemplify a distributed computing system with high Byzantine fault tolerance. Decentralized consensus has therefore been achieved with a blockchain. This makes blockchains potentially suitable for the recording of events, medical records, and other records management activities, such as identity management, transaction processing, documenting provenance, food traceability or voting.

Blockchain structure: A blockchain is a decentralized, distributed and public digital ledger that is used to record transactions across many computers so that the record cannot be altered retroactively without the alteration of all subsequent blocks and the collusion of the network. This allows the participants to verify and audit transactions inexpensively. A blockchain database is managed autonomously using a peer-to-peer network and a distributed timestamping server. They are authenticated by mass collaboration powered by collective self-interests. The result is a robust workflow where participants' uncertainty regarding data security is marginal. The use of a blockchain removes the characteristic of infinite reproducibility from a digital asset. It confirms that each unit of value was transferred only once, solving the long-standing problem of double spending. Blockchains have been described as a value-exchange protocol. This blockchain-based exchange of value can be completed more quickly, more safely and more cheaply than with traditional systems. A blockchain can assign title rights because it provides a record that compels offer and acceptance. https://en.wikipedia.org/wiki/Blockchain Container Host: Physical or Virtual computer system configured with the Windows Container feature. The container host will run one or more Windows Containers.

Container Image: As modifications are made to a containers file system or registry—such as with software installation—they are captured in a sandbox. In many cases you may want to capture this state such that new containers can be created that inherit these changes. That is what an image is—once the container has stopped you can either discard that sandbox or you can convert it into a new container image. For example, let us imagine that you have deployed a container from the Windows Server Core OS image. You then install MySQL into this container. Creating a new image from this container would act as a deployable version of the container. This image would only contain the changes made (MySQL), however it would work as a layer on top of the Container OS Image.

Sandbox: Once a container has been started, all write actions such as file system modifications, registry modifications or software installations are captured in this 'sandbox' layer.

Container OS Image: Containers are deployed from images. The container OS image is the first layer in potentially many image layers that make up a container. This image provides the operating system environment. A Container OS Image is immutable. That is, it cannot be modified.

Container Repository: Each time a container image is created, the container image and its dependencies are stored in a local repository. These images can be reused many times on the container host. The container images can also be stored in a public or private registry.

For someone familiar with virtual machines, containers may appear to be incredibly similar. A container runs an operating system, has a file system and can be accessed over a network just as if it was a physical or virtual computer system. However, the technology and concepts behind containers are vastly different from virtual machines.

Windows Server Containers: provide application isolation through process and namespace isolation technology. A Windows Server Container shares a kernel with the container host and all containers running on the host. These containers do not provide a hostile security boundary and should not be used to isolate untrusted code. Because of the shared kernel space, these containers require the same kernel version and configuration.

Hyper-V Isolation—expands on the isolation provided by Windows Server Containers by running each container in a highly optimized virtual machine. In this configuration, the kernel of the container host is not shared with other containers on the same host. These containers are designed for hostile multitenant hosting with the same security assurances of a virtual machine. Since these containers do not share the kernel with the host or other containers on the host, they can run kernels with different versions and configurations (with in supported versions)—for example, all Windows containers on Windows 10 use Hyper-V isolation to utilize the Windows Server kernel version and configuration.

Running a container on Windows with or without Hyper-V Isolation is a runtime decision. You may elect to create the container with Hyper-V isolation initially and later at runtime choose to run it instead as a Windows Server container.

Rules Engine: A business rules engine such as Drools is a software system that executes one or more business rules in a runtime production environment. The rules might come from legal regulation ("An employee can be fired for any reason or no reason but not for an illegal reason"), company policy ("All customers that spend more than $100 at one time will receive a 10% discount"), or other sources. A business rule system enables these company policies and other operational decisions to be defined, tested, executed and maintained separately from application code. Rule engines typically support rules, facts, priority (score), mutual exclusion, preconditions, and other functions. Rule engine software is commonly provided as a component of a business rule management system which, among other functions, provides the ability to: register, define, classify, and manage all the rules, verify consistency of rules definitions ("Gold-level customers are eligible for free shipping when order quantity>10" and "maximum order quantity for Silver-level customers=15"), define the relationships between different rules, and relate some of these rules to IT applications that are affected or need to enforce one or more of the rules.

RDF query language: that is a semantic query language for databases, able to retrieve and manipulate data stored in Resource Description Framework (RDF) format. It was made a standard by the RDF Data Access Working Group (DAWG) of the World Wide Web Consortium, and is recognized as one of the key technologies of the semantic web. On 15 Jan. 1008, SPARQL 1.0 became an official W3C Recommendation, and SPARQL 1.1 in March 2013. SPARQL allows for a query to consist of triple patterns, conjunctions, disjunctions, and optional patterns.

Implementations for multiple programming languages exist. There exist tools that allow one to connect and semi-automatically construct a SPARQL query for a SPARQL endpoint, for example ViziQuer. In addition, there exist tools that translate SPARQL queries to other query languages, for example to SQL and to XQuery and allow users to write queries against what can loosely be called "key-value" data or, more specifically, data that follow the RDF specification of the W3C. Thus, the entire database is a set of "subject-predicate-object" triples. This is analogous to some NoSQL databases' usage of the term "document-key-value", such as MongoDB. In SQL relational database terms, RDF data can also be considered a table with three columns—the subject column, the predicate column, and the object column. The subject in RDF is analogous to an entity in a SQL database, where the data elements (or fields) for a given business object are placed in multiple columns, sometimes spread across more than one table, and identified by a unique key. In RDF, those fields are instead represented as separate predicate/object rows sharing the same subject, often the same unique key, with the predicate being analogous to the column name and the object the actual data. Unlike relational databases, the object column is heterogeneous: the per-cell data type is usually implied (or specified in the ontology) by the predicate value. Also, unlike SQL, RDF can have multiple entries per predicate; for instance, one could have multiple "child" entries for a single "person", and can return collections of such objects, like "children".

Thus, SPARQL provides a full set of analytic query operations such as JOIN, SORT, AGGREGATE for data whose schema is intrinsically part of the data rather than requiring a separate schema definition. However, schema information (the ontology) is often provided externally, to allow joining of different datasets unambiguously. In addition, SPARQL provides specific graph traversal syntax for data that can be thought of as a graph.

Application programming interface (API): In computer programming, an API is a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage. Just as a graphical user interface makes it easier for people to use programs, application programming interfaces make it easier for developers to use certain technologies in building applications. By abstracting the underlying implementation and only exposing objects or actions the developer needs, an API simplifies programming. While a graphical interface for an email client might provide a user with a button that performs all the steps for fetching and highlighting new emails, an API for file input/output might give the developer a function that copies a file from one location to another without requiring that the developer understand the file system operations occurring behind the scenes.

Libraries and frameworks: An API is usually related to a software library. The API describes and prescribes the expected behavior (a specification) while the library is an actual implementation of this set of rules. A single API can have multiple implementations (or none, being abstract) in the form of different libraries that share the same programming interface. The separation of the API from its implementation can allow programs written in one language to use a library written in another. API use can vary depending on the type of programming language involved. An API for a procedural language such as 1un could primarily consist of basic routines to execute code, manipulate data or handle errors, while an API for an object-oriented language such as Java would provide a specification of classes and their class methods.

Language bindings are also APIs. By mapping the features and capabilities of one language to an interface implemented in another language, a language binding allows a library or service written in one language to be used when developing in another language. Tools such as SWIG and F2PY, a Fortran-to-Python interface generator, facilitate the creation of such interfaces. An API can also be related to a software framework: a framework can be based on several libraries implementing several APIs, but unlike the normal use of an API, the access to the behavior built into the framework is mediated by extending its content with new classes plugged into the framework itself. Moreover, the overall program flow of control can be out of the control of the caller and in the hands of the framework via inversion of control or a similar mechanism.

Figure 1:
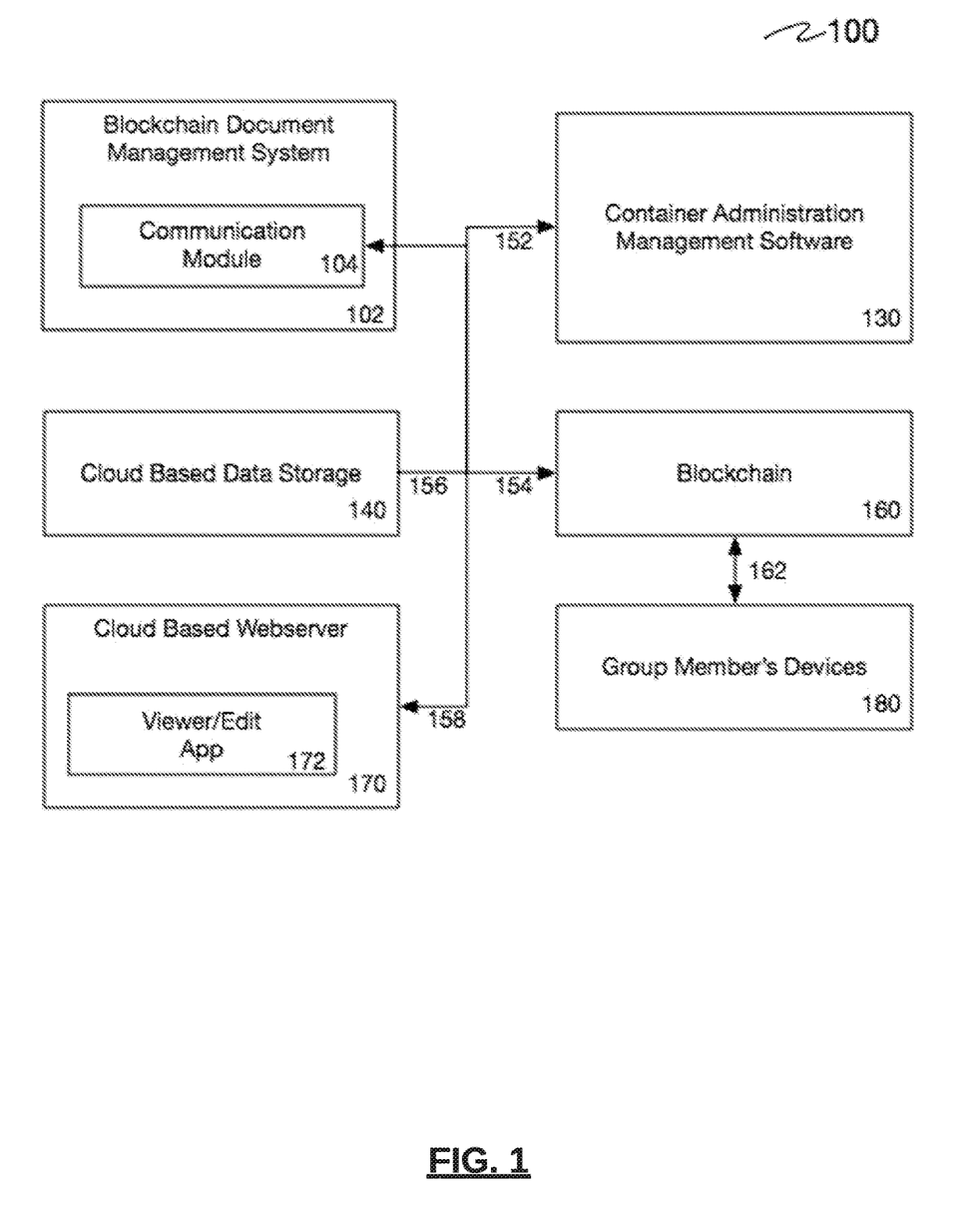
FIG. 1 is a diagram of an embodiment of a document storage in a blockchain network in accordance with one or more embodiments.

FIG. 1 presents the entities in the current system, in one embodiment 100. The Blockchain Document Management System (BDMS) 102 may perform the majoring of the functionality of the current invention and is responsible for functionality such as the management of keys, authentication, rules, formatting documents. The BDMS includes a communication module 104, wherein communication occurs with entities outside of the BDMS.

The Container Administration Management Software 130 interacts with the BDMS and the Cloud Based Data Storage 140 to manage the "Data Space" of the container.

The Cloud Based Webserver 170 is a logical server that is built, hosted and delivered through a cloud computing platform over the Internet. Cloud servers possess and exhibit similar capabilities and functionality to a typical server but are accessed remotely from a cloud service provider. The Cloud Based Webserver includes an application 172 wherein the user is able to interact with the document.

The blockchain 160 interacts with the system and interfaces with the authenticated and verified members 180 of the blockchain.

Figure 2:
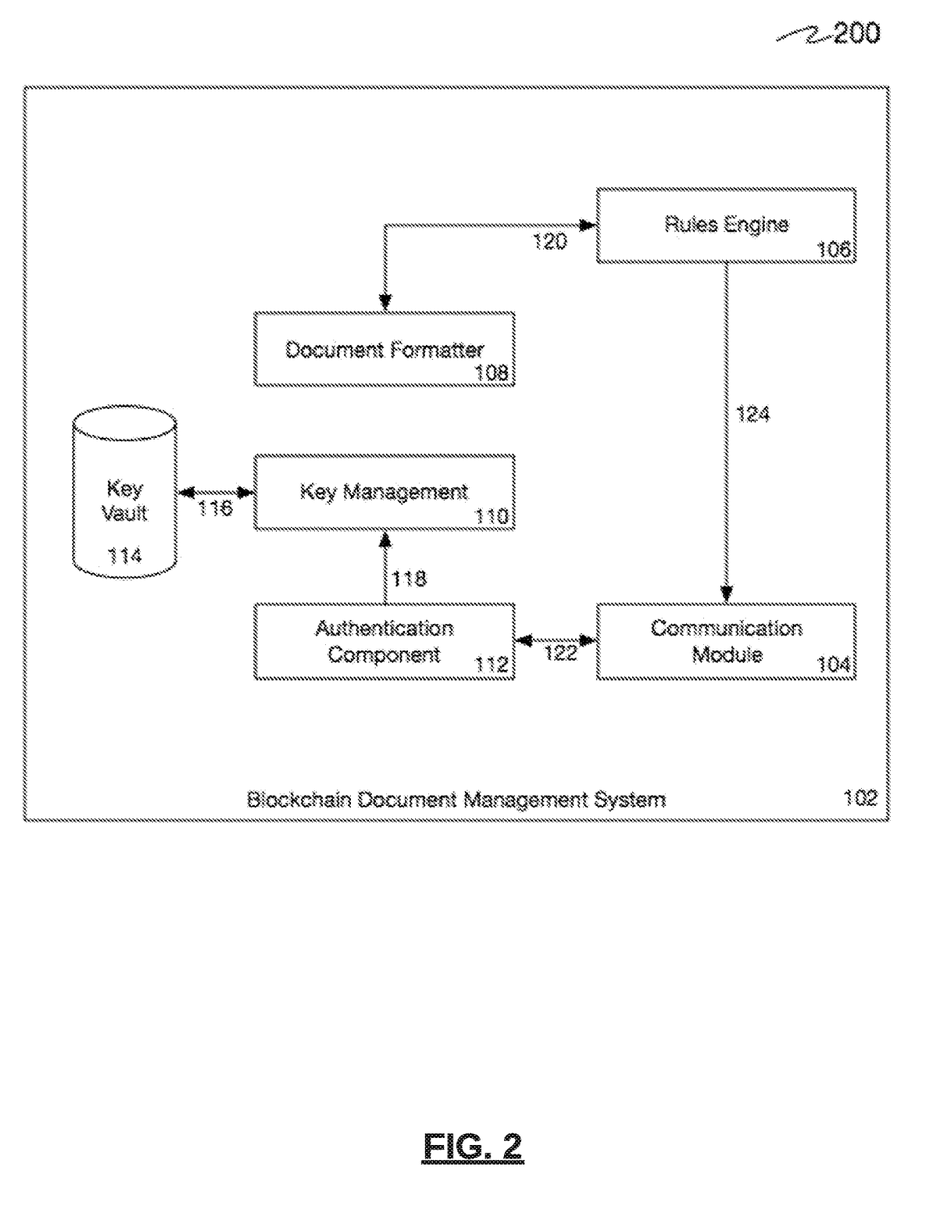
FIG. 2 is a diagram of a blockchain document management system in accordance with one or more embodiments.

FIG. 2 shows a second portion of the system diagram in one implementation of the current application 200. The diagram expands on the contents of the BDMS 102. In the BDMS, a key vault 114 retains data encryption keys and interfaces with the key management module 110. The key management module formats and generates a cryptographic key for a document. The authentication component 112 is responsible for authenticating the keys and communicates with outside entities via the communication module 104. The rules engine 106 contains a timer wherein sensitive data much be rekeyed. Finally, the document formatter 108 formats and generates a cryptographic key for an incoming document.

Figure 3:
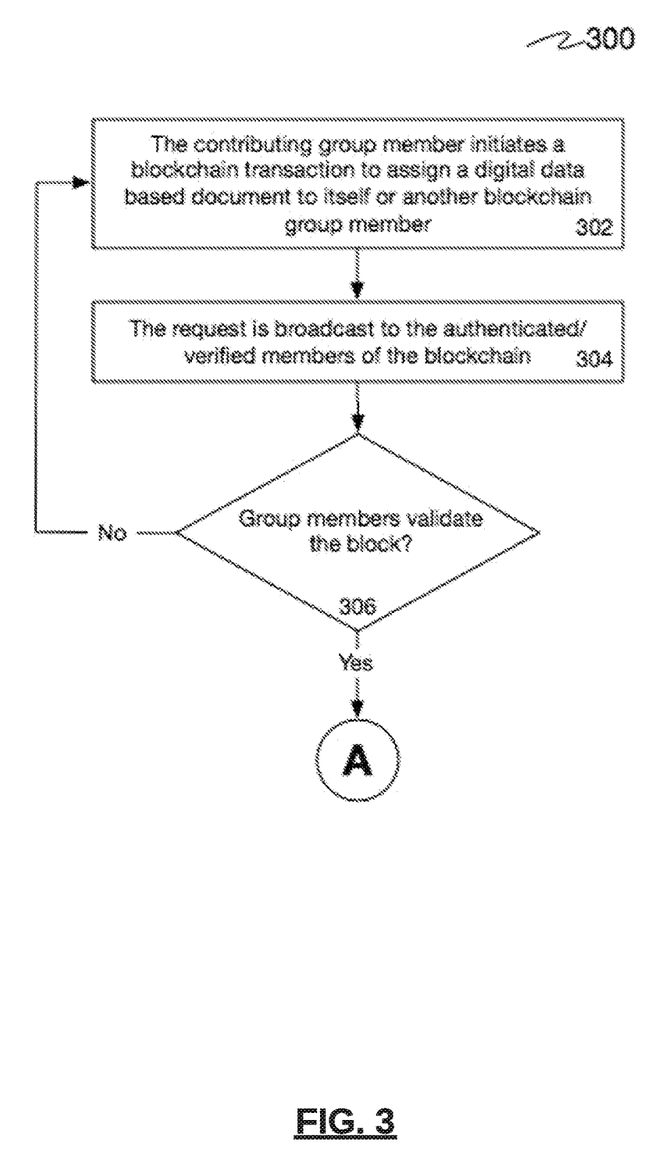
FIG. 3 is a flowchart in accordance with one or more embodiments.

FIG. 3 shows a first flowchart of one implementation of the current application 300. The contributing group member 180 Initiates a Transaction to assign a digital data-based document to themselves or another blockchain 160 group member 302. The request is then broadcast 154, 162 to the authenticated and verified members 180 of the blockchain 160 304. The assignment is formatted in the form of a blockchain 160 transaction. A check is then made to determine if the group members validate the block 306. If there is not validation, the process begins again at the top of the flow.

If the group members validate the block, the process takes a number of paths reflected in the different embodies of the following flows below.

Figure 4:
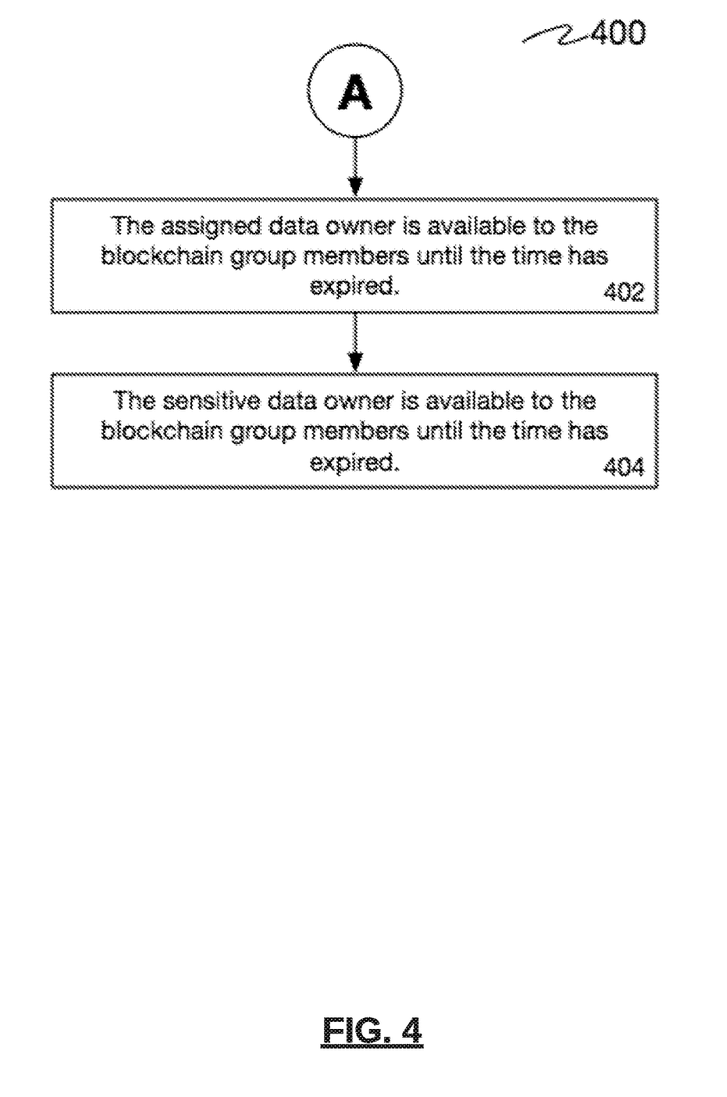
FIG. 4 is another flowchart in accordance with one or more embodiments.

FIG. 4 shows one embodiment of the functionality of the current application 400 when the group members have validated the block. The assigned data owner is only available to the blockchain group members until the time set in the rules engine 106 has expired 402. The adding of data as a transaction is represented as a block. A time is set in the rules engine 106 for the sensitive data to be re-keyed 110, and therefore no longer available to group members 180 who will not receive the new Data encryption keys 172 404.

Figure 5:
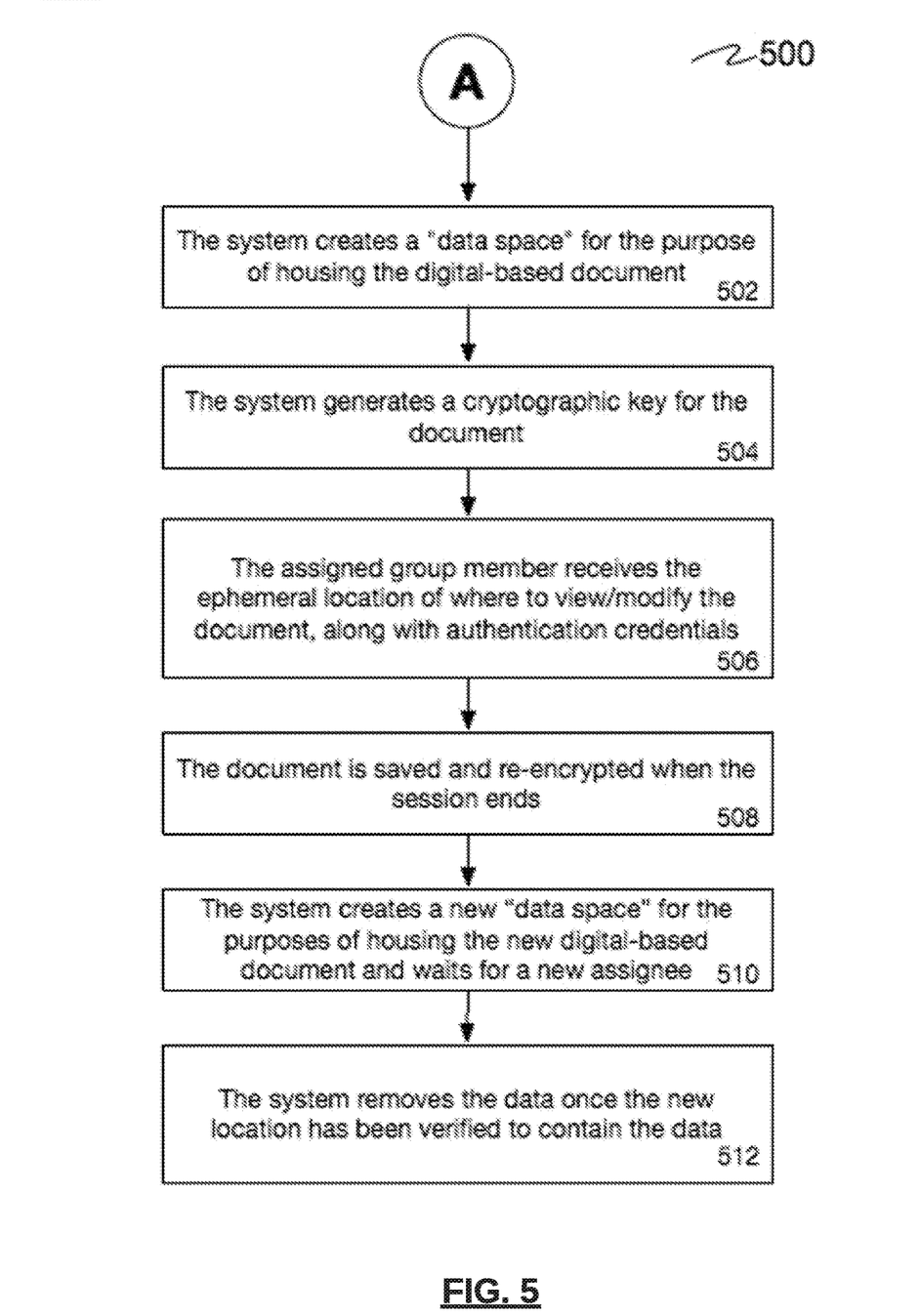
FIG. 5 is a further flowchart in accordance with one or more embodiments.

FIG. 5 shows another embodiment of the functionality of the current application 500 when the group members have validated the block. The group members 180 approve the block is valid (the assignment of the digital data document owner). The system 100 creates 156 a "data space." 140 for the purposes of housing the digital based document 502. The system 100 generates formats 108 and generates a Cryptographic Key 110 for the incoming document 162/154, 504. The assigned group member 180 receives 162 the ephemeral location 140 of where to view or modify the file, along with authentication credentials 172, 506. The keys 172 to the data are distributed 152 to the blockchain 160 group members 180, as a normal transaction data block for the blockchain. Once the assigned user has viewed the file through the systems "Viewer/Edit" interface, the file is saved and re-encrypted when the assigned group member concludes the session 508. The system creates a new "data space" for the purposes of housing the digital based document and waits for a new assignee for the digital data-based document 510. Finally, the system removes the data when the new location has been verified to contain the data 512.

Figure 6:
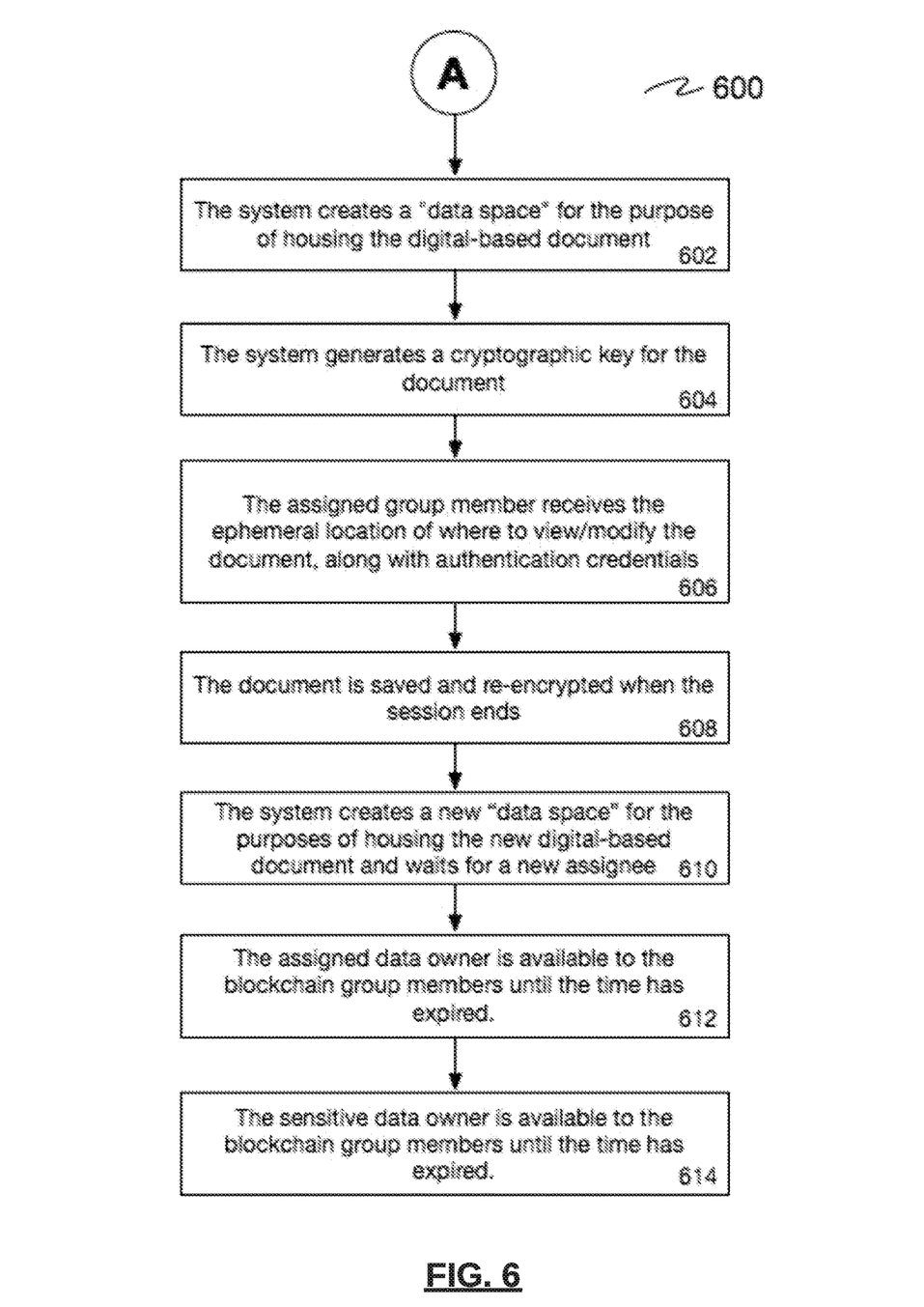
FIG. 6 is yet a further flowchart in accordance with one or more embodiments.

FIG. 6 shows yet another embodiment of the functionality of the current application 600 when the group members have validated the block. The system 100 creates 156 a "data space" 140 for the purposes of housing the digital based document 602. The system 100 formats 108 and generates a Cryptographic Key 110 for the incoming document 162/154, 604. The assigned group member 180 receives 162 the ephemeral location 140 of where to view or modify the file, along with authentication credentials 172, 606. The keys 172 to the data are distributed 152 to the blockchain 160 group members 180, as a normal transaction data block for the blockchain. Once the assigned user has viewed the file through the systems "Viewer/Edit" interface, the file is saved and re-encrypted when the assigned group member concludes the session 608. The system creates a new "data space" for the purposes of housing the digital based document 610. The system may choose via an RNG Random Number Generator, one of several pre-defined and secure "data spaces" for the purpose of housing the digital based document and awaits a new assignee for the digital data-based document 610. The assigned data owner is only available to the blockchain group members until the time set in the rules engine 106 has expired 612. The adding of data as a transaction is represented as a block. A time is set in the rules engine 106 for the sensitive data to be re-keyed 110, and therefore no longer available to group members 180 who will not receive the new Data encryption keys 172, 614.

What is claimed is:

1. A method, comprising:
   initiating a transaction of a blockchain by a contributing member of a blockchain group to assign a digital data based document to itself or to at least one other member of the group;
   validating a block of the blockchain associated with the transaction by the contributing member or the at least one other verified member;
   sending an ephemeral location of the document to the contributing member or the at least one other verified member; and
   modifying the document in the ephemeral location by the contributing member or the at least one other verified member to create a modified document,
   saving the modified document,
   appending a subsequent transaction of the blockchain to record the saving of the modified document, and
   withdrawing verification in the blockchain group for at least one of the contributing member and the at least one other verified member after a defined time interval.

2. The method of claim 1, comprising modifying the document based on authentication credentials of the contributing member or the at least one other verified member.

3. The method of claim 2, wherein the authentication credentials include keys that are distributed to the contributing member or the at least one other verified member as a normal transaction data block for the blockchain.

4. The method of claim 1, comprising, responsive to the validating of the block, creating a data space and a cryptographic key for the document.

5. The method of claim 1, comprising, rekeying sensitive data of the document upon expiration of a defined time interval.

6. The method of claim 1, comprising encrypting the modified document prior to saving the modified document.

7. The method of claim 1, comprising choosing a data space to store the digital data based document using a random number generator.

8. A system, comprising:
   a processor and
   a memory communicably coupled to the processor;
   wherein the processor is configured to:
      initiate a transaction of a blockchain by a contributing member of a blockchain group to assign a digital data based document to itself or to at least one other verified member of the group;
      validate a block of the blockchain associated with the transaction by the contributing member or the at least one other verified member;
      send an ephemeral location of the document to the contributing member or the at least one other verified member; and
      modify the document in the ephemeral location by the contributing member or the at least one other verified member to create a modified document,
      save the modified document,
      append a subsequent transaction of the blockchain to record the saving of the modified document, and
      withdraw verification in the blockchain group for at least one of the contributing member and the at least one other verified member after a defined time interval.

9. The system of claim 8, wherein the processor is configured to modify the document based on authentication credentials of the contributing member or the at least one other verified member.

10. The system of claim 9, wherein the authentication credentials include keys are distributed to the contributing member or the at least one other verified member as a normal transaction data block for the blockchain.

11. The system of claim 8, wherein the processor is configured to, create a data space and a cryptographic key for the document after the block is validated.

12. The system of claim 8, wherein the processor is configured to rekey sensitive data of the document upon the expiration of the defined time interval.

13. The system of claim 8, wherein the processor is configured to encrypt the modified document prior to saving the modified document.

14. The system of claim 8, wherein the processor is configured to choose a data space to store the digital data based document using a random number generator.

15. A non-transitory computer readable medium comprising instructions, that when read by a processor, cause the processor to perform:
- initiating a transaction of a blockchain by a contributing member of a blockchain group to assign a digital data based document to itself or to at least one other verified member of the group;
- validating a block of the blockchain associated with the transaction by the contributing member or the at least one other verified member;
- sending an ephemeral location of the document to the contributing member or the at least one other verified member; and
- modifying the document in the ephemeral location by the contributing member or the at least one other verified member to create a modified document,
- saving the modified document,
- appending a subsequent transaction of the blockchain to record the saving of the modified document, and
- withdrawing verification in the blockchain group for at least one of the contributing member and the at least one other verified member after a defined time interval.

16. The non-transitory computer readable medium of claim 15, comprising modifying the document based on authentication credentials of the contributing member or the at least one other verified member.

17. The non-transitory computer readable medium of claim 16, wherein the authentication credentials include keys are distributed to the contributing member or the at least one other verified member as a normal transaction data block for the blockchain.

18. The non-transitory computer readable medium of claim 15, wherein the instructions cause the processor to create a data space and a cryptographic key for the document.

19. The non-transitory computer readable medium of claim 15, wherein the instructions cause the processor to encrypt the modified document prior to saving the modified document.

20. The non-transitory computer readable medium of claim 15, wherein the instructions cause the processor to choose a data space to store the digital data based document using a random number generator.

* * * * *